United States Patent [19]

Williams

[11] Patent Number: 4,790,696
[45] Date of Patent: Dec. 13, 1988

[54] CHUCK KEY MOUNTING AND EJECTOR ARRANGEMENT

[75] Inventor: Edward A. Williams, Southam, England

[73] Assignee: The Stanley Works, New Britain, Conn.

[21] Appl. No.: 128,268

[22] Filed: Dec. 3, 1987

[51] Int. Cl.$^4$ .......................... B25F 5/02; B23B 45/00
[52] U.S. Cl. ................................. 408/241 R; 81/490; 206/379; 279/1 K
[58] Field of Search .................. 279/1 K; 408/241 R; 81/16, 124.1, 490; 206/379; 211/69, 70.6

[56] References Cited

U.S. PATENT DOCUMENTS

| | | |
|---|---|---|
| D. 279,957 | 8/1985 | Akazawa et al. . |
| 1,647,396 | 11/1927 | Decker . |
| 1,798,234 | 3/1931 | Toppin . |
| 1,821,436 | 9/1931 | Holloway . |
| 2,322,797 | 6/1943 | Fishel ........................... 211/69 |
| 3,224,302 | 12/1965 | Cooley, Jr. ................ 81/124.1 |
| 3,348,432 | 10/1967 | Kieffer . |
| 3,664,754 | 5/1972 | Kelbel . |
| 4,032,160 | 6/1977 | Karasa et al. . |
| 4,068,978 | 1/1978 | Brock . |
| 4,477,213 | 10/1984 | Nelson et al. . |

FOREIGN PATENT DOCUMENTS

| | | | |
|---|---|---|---|
| 2302164 | 9/1976 | France ............................ | 408/241 R |
| 58-17689 | 4/1983 | Japan ................................. | 279/1 K |

OTHER PUBLICATIONS

Six (6) photographs of the Toshiba Cordless Drill Model CDR-7.

*Primary Examiner*—Gil Weidenfeld
*Assistant Examiner*—Daniel W. Howell
*Attorney, Agent, or Firm*—Chilton, Alix & Van Kirk

[57] ABSTRACT

A tool housing includes first and second coaxial openings on opposite sides of the housing. Wall structure is provided for guiding the key head into the interior of the housing, where the key head is engaged by retaining structure. The second opening has an ejector member mounted therein for movement toward and away from the first opening. When the user of the tool wishes to eject the key from the housing, he pushes on the outer portion of the ejector member, causing the portion of the member innermost to the housing to contact the key head and to disengage and displace it outwardly through the first opening, thereby releasing the key from the housing.

11 Claims, 2 Drawing Sheets

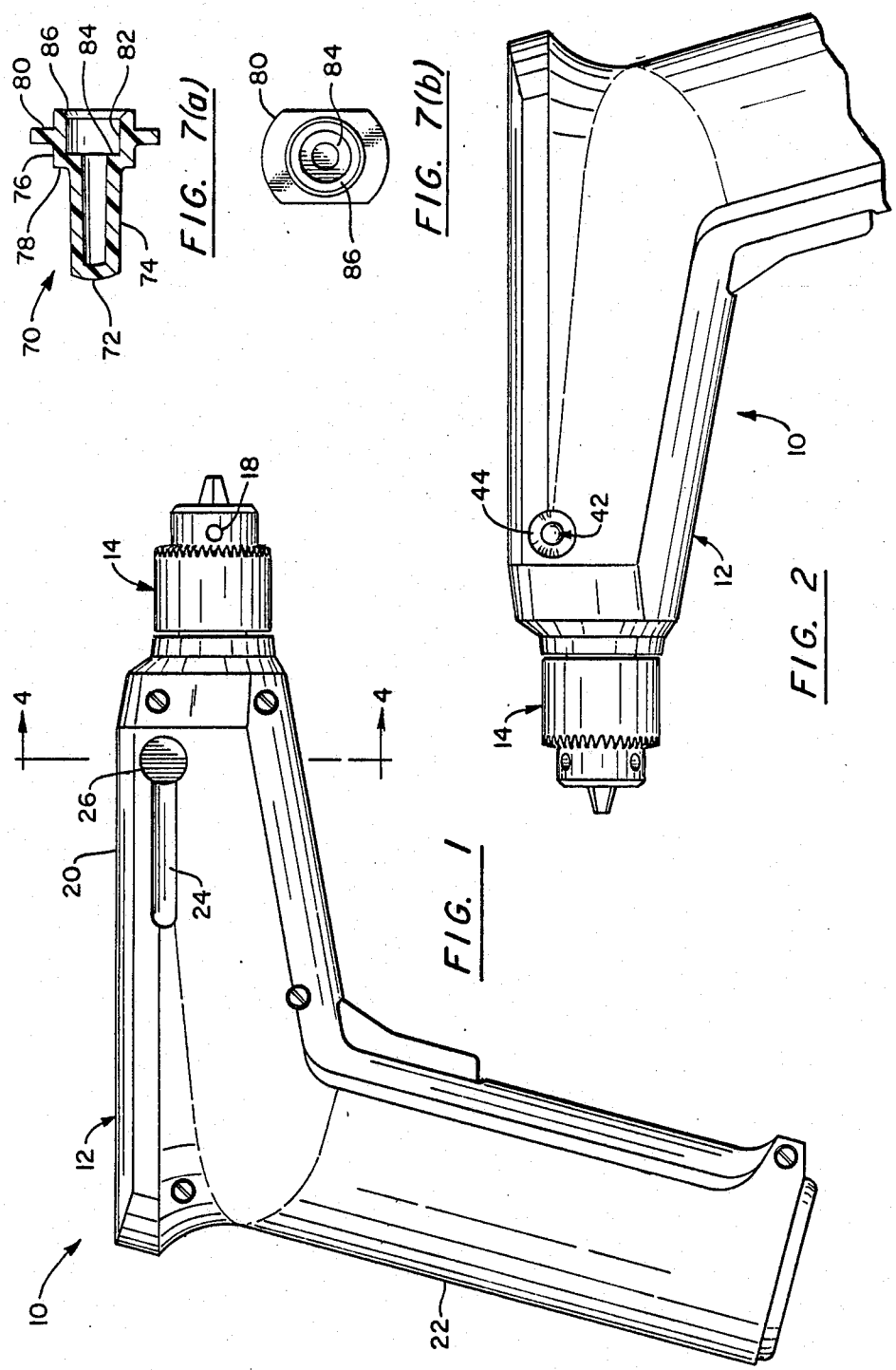

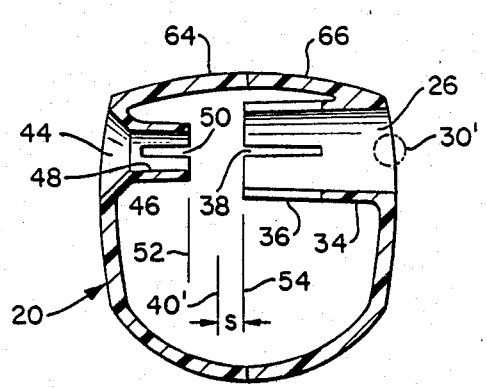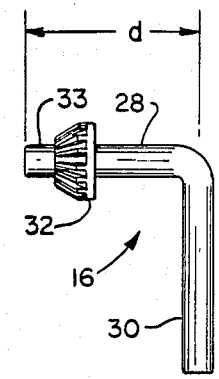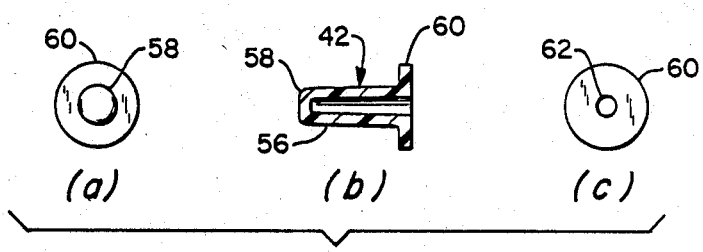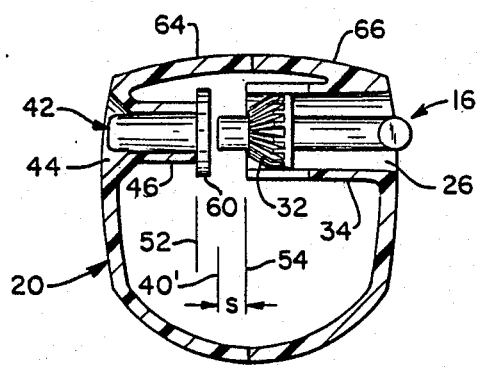

CHUCK KEY MOUNTING AND EJECTOR ARRANGEMENT

BACKGROUND OF THE INVENTION

This invention pertains to tools, and more particularly to hand-held power tools.

In several types of hand-held power tools, such as a power drill, a bit or similar specialized piece must be rigidly connected to the rotating or other power source before the power is turned on and the tool is brought to bear on the workpiece. For example, a hand-held drill may be capable of accommodating a variety of bit sizes, the choice of bit depending on the size of the hole or the nature of the material to be drilled. Typically, a chuck is disposed at the outer portion of the drill shaft. A chuck key is required to adjust the size of the mouth of the chuck, and to tighten the chuck around the bit after it has been inserted.

Since the key is typically much smaller than the drill and not usually furnished with its own convenient storage container, some attempts have been made in the prior art to adapt the tool to carry the key and thus have it readily available whenever the chuck is to be adjusted. Most previous attempts to mount the key on the main body or handle of the drill involved a simple spring clip into which the key was pushed for mounting. In U.S. Pat. No. 1,821,436, an L-shaped chuck key is shown mounted within the side of the tool housing. In that arrangement, a spring is loaded into the blind end of a hole for receiving one leg of the key and the other leg is inserted within a cross passage after the spring is loaded by insertion of the key. As the exposed leg is moved out of the cross passage, the loaded spring urges the key outwardly from the housing so that it can be fully removed.

These prior attempts at mounting the key within the housing were generally unsafe, unsightly, difficult to use, or relatively expensive to manufacture.

SUMMARY OF THE INVENTION

It is an object of the present invention to provide a safe, convenient, aesthetically pleasing and inexpensive arrangement for detachably mounting a chuck key or the like onto the housing of a tool.

In accordance with the invention, the tool housing includes first and second coaxial openings on opposite sides of the housing. Wall structure is provided for guiding the key head into the interior of the housing, where the key head is engaged by retaining structure. The second opening has an ejector member mounted therein for movement toward and away from the first opening. When the user of the tool wishes to eject the key from the housing, he pushes on the outer portion of the ejector member, causing the portion of the member innermost to the housing to contact the key head and to disengage and displace it outwardly through the first opening, thereby releasing the key from the housing. For angled keys, a recess can be provided along the exterior of the housing, contiguous with the first opening.

The present invention thus provides a key mounting arrangement that "hides" much of the key within the housing, and the portion that remains outside the housing rests within a recess that is unobstructive and which substantially maintains the smooth profile of the housing where it is mounted. Neither the mounting structure nor the key when mounted, protrudes excessively from the housing where it could otherwise present safety concerns or distract from the appearance of the tool. Furthermore, in the preferred embodiment where the mounting arrangement is in the barrel portion of a hand-held power tool, the tool handle may be held with one hand, and the key secured into, or ejected from the mounting arrangement with simple finger movement of the other hand.

BRIEF DESCRIPTION OF THE DRAWINGS

The preffered embodiment of the invention will be described below with reference to the accompanying figures, in which:

FIG. 1 is an elevation view of the right side of a hand-held power tool incorporating the invention;

FIG. 2 is an elevation view of a portion of the left-hand side of the power tool shown in FIG. 1;

FIG. 3 is a side view of a typical L-shaped chuck key for use with the tool shown in FIG. 1;

FIG. 4 is a section view of FIG. 1 along the lines 4—4, showing the structure for receiving the key and the ejector pin, but with the key and ejector pin omitted for clarify;

FIG. 5 illustrates one form of the ejector pin;

FIG. 6 is a view similar to that of FIG. 4, showing the ejector pin and the key as mounted within the housing; and FIGS. 7(a) and (b) illustrate an alternative form of ejector pin.

DESCRIPTION OF THE PREFERRED EMBODIMENT

FIGS. 1, 2, and 3 show a hand-held power tool 10 having a housing 12, a chuck 14 at the forward end of the housing and an L-shaped key 16 adapted to engage the key hole 18 in the chuck. The housing 12 typically has a barrel section 20 and a handle section 22.

An elongated recess 24 on the barrel portion 20 of the housing is adapted to receive in conforming relation, the long leg 30 of the key 16. Preferably, this recess is oriented longitudinally with the generally tubular portion of the barrel, at a position above the drill shaft (not shown) which passes longitudinally through the barrel and is connected to the chuck 14. A first opening 26 is located at one end of the recess, and is large enough to accept the head portion 32 on the short leg 28 of the key. As shown in FIG. 2, the other side of the housing has a second opening 44 in coaxial alignment with the first opening, in which is located an ejector pin 42.

The preferred structural and operational features of the invention will now be described in detail with reference to FIGS. 3, 4, 5 and 6. FIG. 4 is a section view of the barrel taken along lines 4—4 of FIG. 1 with the drill shaft and associated structures deleted for clarity, so that only the structural features of the housing or barrel 20 associated with the present invention are shown. Structures for receiving the key include first opening 26 defined by a generally cylindrical first wall 34 extending into the center or slighlty past the mid-plane of the housing. The inner surface 36 of the first wall 34 can be tapered inwardly and the wall preferably has split fingers as shown at 38.

When the key 16 shown in FIG. 3 is to be mounted in the housing, the short leg 28 is inserted through the opening 26 until the cylindrical portion of head 32 on the short leg engages the tapered surface 36 by an interference fit. The long leg 30 is shown in its mounted position (in phantom) at 30'. Substantially the entire length d of the short leg 28 enters the housing, resulting in the nipple portion 33 of the head 32 protruding beyond the wall means 34, to a secured position 40'. In the illustrated embodiment, the only portion of the key that extends beyond the profile of the barrel, is approximately one-half of the diameter of the long leg 30'.

When the key is to be ejected from the housing, the ejector pin 42 is pushed inwardly through the passage associated with the second opening 44 into contact with the key 16. The passage of the second opening 44 is defined by a generally cylindrical, second wall 46 which is transverse to the barrel and extends into the housing coaxially with and preferably in spaced relation from the first wall 34. The inner surface 48 of the second wall may also be tapered or split as shown at 50.

The portion of the ejector pin 42 disposed in the space between the first wall 34 and the second wall 46, is adapted to slide coaxially between a minimum inserted position 52 and a maximum inserted position 54. As described above, when the head 32 is fully secured within the wall 34, the innermost extent of the leg is located at position 40'. Thus, when the ejector pin 42 is moved from its minimum position 52 to its maximum position 54, it displaces the key head 32 a distance s along the axis of opening 26. This displacement is sufficient to disengage the head 32 from its interference with the wall surface 36, and to permit the operator to easily remove the key 16 from the barrel while using only his fingers.

A basic form of the ejector pin 42 is shown in FIGS. 5(a) through 5(c). The ejector pin has a body portion 56, a closed end 58 and an enlarged end 60. Preferably, the body portion is hollow as shown in 62 and slightly tapered from the enlarged to the closed end. Depending on the tapered of the body portion 56, the minimum inserted position of the ejector pin within the barrel 20, can be controlled to be anywhere between position 52, which is the inner extremity of the wall 46, to position 40', which is the inner extent of the head 32 when secured within the wall 34. For example, to avoid looseness of the ejector pin 42 while in the nominal or minimum position, it may be preferable to provide a taper on the pin 56 (or surface 48) such that when the key is inserted into opening 26, the leg 28 or head 32 contacts the enlarged end 60 and urges the body portion 56 into slight interference fit with the inner surface 48 of the wall 46.

An alternative form of the ejector pin is shown in FIGS. 7(a) and (b). The pin 70 has a closed end 72, a body portion 74, and an enlarged end 76. The closed end 72 and body portion 74 are similar to the corresponding portions 58, 56 shown in FIG. 5. The enlarged end 76, however, includes cylindrical first shoulder 78 facing the closed end 72 and a second shoulder or rim 80. The enlarged end 76 is bored and countersunk to define a cavity 82 having a base 84 at the interior and a guideway 86 at the exterior thereof. The cavity 82 is located radially within the rim 80.

In the pin embodiment of FIG. 7, the shoulder 78 limits the displacement of the pin 70 toward opening 44, by contact against wall 46. The rim 80 limits the displacement of the pin 70 toward the opening 26 by contact against wall 34. As the pin is displaced toward the key 16 to eject the key, the guideway 86 guides the nipple portion 33 of the head 32 into cavity 82, where it contacts the base 84 and is urged toward opening 26.

The ejector pin 42, 70 is normally mounted within housing 20 at the time the housing 20 is assembled. Typically, the right half 66 of the barrel 20 would have the first opening 26 and wall 34, and the left half 64 of the barrel would have the second opening 44 and second wall 46. Just prior to joining of the two barrel halves 64, 66, the ejector pin would be inserted through the second wall 46 from within the barrel half 64 until it occupied the position shown in FIG. 6. Then the right-hand barrel portion 66 would be joined to the left hand portion 64, typically along the vertical mid plane. As a further assurance that the ejector pin 42, 70 will not drop out of the opening 44 or pass through the opening 26, the outer diameter of the enlarged portion 60, 76 is preferably at least as large as the outer diameters of the first wall 34 and second wall 46.

The preferred embodiment having been described, it should be evident to those skilled in this art that certain details described herein can be altered or modified without departing from the scope of the invention as set forth in the claims. For example, the location and form of the wall 34 associated with the first opening can vary from that described herein, so long as it performs the function of receiving the head portion of the key through the first opening. The head portion may be retained by structure at the innermost end of the first wall 34, or elsewhere within or between the first and second walls. The key may be straight, L-shaped as shown, or otherwise angled, such as T-shaped, in which case the recess on the housing would cradle the long leg or top of the "T" and the first opening would be positioned substantially in the center of the recess, for receiving the central leg of the "T". Thus, when a recess is provided, the first opening should be contiguous with the recess, but not necessarily at one end thereof.

I claim:

1. An arrangement for detachably mounting a chuck key or the like having a key head, onto the housing of a tool, comprising:
   a tool having a housing;
   first and second coaxial openings on opposite sides of the housing;
   means for guiding the key head through said first opening into the interior of the housing;
   means coaxial with the means for guiding, for retaining the key head within the housing; and
   means associated with said second opening for reciprocating toward and away from said first opening to selectively disengage said key head from its retained position within said means for retaining the key head.

2. The arrangement of claim 1 wherein:
   said means for guiding the key head includes substantially cylindrical first wall means extending from the first opening toward the second opening; and
   said means for retaining the key head is formed on the means for guiding the key head.

3. The arrangement of claim 2 further including second wall means extending from the second opening toward the first opening; and
   wherein said means for reciprocating is mounted for movement within said second wall means.

4. The arrangement of claim 3, wherein said means for reciprocating comprises an ejector pin mounted for movement between a minimum and a maximum inserted position, such that when the ejector pin is in the minimum position the key head is retained within the means for retaining, and when the ejector pin is moved from the minimum to the maximum inserted position, the pin disengages the key head so that the key head is released through the first opening.

5. The arrangement of claim 2 wherein said means for retaining the key head includes split fingers formed on the means for receiving the key head, intermediate the first and second openings.

6. The arrangement of claim 1 further including wall means extending from the second opening toward the first opening; and
wherein said means for reciprocating is mounted for movement within said wall means.

7. The arrangement of claim 4 wherein said ejector pin includes a generally cylindrical body portion having a closed end accessible from the exterior of the housing and an enlarged inner end disposed within the housing between said first and second wall means, said enlarged end being adapted to contact the key head for displacing it from the first opening.

8. The arrangement of claim 7, wherein said enlarged end includes a substantially cup-shaped tip for guiding the ejector pin into contact with said key head.

9. The arrangement of claim 8, wherein the enlarged end includes a shoulder for providing a stop surface against the second wall, a rim for providing a stop surface against the first wall, and wherein the cup-shaped tip is in the form of a cavity disposed radially within the rim, the cavity having a base for contacting a portion of the key head.

10. The arrangement of claim 1 wherein the key includes one leg on which the key head is formed and another leg at substantially a right angle to said one leg, and said arrangement further includes an elongated recess formed on the exterior of the housing for cradling said other leg of the key when said one leg is contained within the means for receiving the key head.

11. The arrangement of claim 6, wherein said means for reciprocating comprises an ejector pin mounted for movement between a minimum and a maximum inserted position, such that when the ejector pin is in the minimum position the key head is retained within the means for retaining, and when the ejector pin is moved from the minimum to the maximum inserted position, the pin disengages the key head so that they key head is released through the first opening.

* * * * *